United States Patent [19]
Ellsworth

[11] Patent Number: 5,962,553
[45] Date of Patent: Oct. 5, 1999

[54] ORGANOCLAY-POLYMER COMPOSITES

[75] Inventor: Mark W. Ellsworth, Oakland, Calif.

[73] Assignee: Raychem Corporation, Menlo Park, Calif.

[21] Appl. No.: 08/708,241

[22] Filed: Sep. 3, 1996

[51] Int. Cl.[6] ...................................................... C08K 9/00
[52] U.S. Cl. .......................... 523/216; 523/213; 523/209; 428/421; 428/422; 524/154; 524/443; 524/445; 524/447
[58] Field of Search ...................................... 524/154, 443, 524/445; 428/421, 422; 523/213, 216, 209

[56]         References Cited

U.S. PATENT DOCUMENTS

| 4,515,633 | 5/1985  | Cruz, Jr. ............................... 106/18.26 |
| 4,708,975 | 11/1987 | Shain ....................................... 523/216 |
| 4,756,851 | 7/1988  | Billigmeier et al. ..................... 252/572 |
| 4,810,734 | 3/1989  | Kawasumi et al. ...................... 523/216 |
| 4,889,885 | 12/1989 | Usuki et al. ............................. 524/445 |
| 4,894,411 | 1/1990  | Okada et al. ............................ 524/710 |
| 4,960,740 | 10/1990 | House et al. ............................ 501/148 |
| 5,110,501 | 5/1992  | Knudson, Jr. et al. ............... 252/315.2 |
| 5,160,454 | 11/1992 | Knudson, Jr. et al. ............... 252/315.2 |
| 5,334,241 | 8/1994  | Jordan ..................................... 106/487 |
| 5,385,776 | 1/1995  | Maxfield et al. ........................ 428/297 |
| 5,401,587 | 3/1995  | Motohiro et al. ........................ 428/688 |
| 5,421,876 | 6/1995  | Janoski ................................... 106/278 |
| 5,552,469 | 9/1996  | Beall et al. .............................. 524/445 |
| 5,578,672 | 11/1996 | Beall et al. .............................. 524/446 |
| 5,587,084 | 12/1996 | Boyd et al. .............................. 210/691 |

FOREIGN PATENT DOCUMENTS

| 0459 472 A1 | 12/1991 | European Pat. Off. . |
| 0 542 266 A2 | 5/1993 | European Pat. Off. . |
| 38 06548 A1 | 9/1988 | Germany . |
| WO 93/04117 | 3/1993 | WIPO . |
| WO 93/04118 | 3/1993 | WIPO . |
| WO 93/11190 | 6/1993 | WIPO . |

OTHER PUBLICATIONS

Machado et al., *ANTEC '95*, pp. 2335–2339 (1995).
Vaia et al., *Chem. Mater.*, vol. 5, pp. 1694–1696 (1993).
Lan et al., *Chem. Mater.*, vol. 7, pp. 2144–2150 (1995).
Ijdo et al., *Adv. Mater.*, vol. 8, No. 1, pp. 79–83 (1996).

*Primary Examiner*—Judy M. Reddick
*Attorney, Agent, or Firm*—Herbert G. Burkard; Yuan Chao

[57]           ABSTRACT

Nanocomposites are made by melt-blending a melt processable polymer having a high melt processing temperature and an organophosphonium cation modified layered clay. Such modified layered clay is more stable at the higher temperatures encountered during the melt processing of such a melt processable polymer than the modified layered clays used in the prior art, enabling the preparation of the nanocomposite.

5 Claims, 2 Drawing Sheets

ORGANOCLAY-POLYMER COMPOSITES

TECHNICAL FIELD OF THE INVENTION

This invention relates to a composite made by blending an organoclay and a melt processable polymer having a high melt processing temperature.

BACKGROUND OF THE INVENTION

Inorganic-organic nanocomposites often exhibit properties exceeding those of macroscopic composites. Typically, the inorganic component is a modified clay and the organic component is a polymer. While the definition of a nanocomposite is still a subject of debate, a generally accepted working definition for inorganic-organic nanocomposites is a composite in which the inorganic phase is no larger than 1 micron in size and the organic (polymeric) phase is continuous, that is, nanocomposites are highly dispersed systems of submicron-sized inorganic particles in a polymeric matrix. Such nanocomposites are not to be confused with ordinary composites of an unmodified clay (i.e., a clay in its natural state), such as mica or talc, and a polymer, where the clay simply acts as a filler for economic reasons, with negligible impact on physical properties.

To illustrate, nanocomposites made from alkyl quaternary ammonium modified bentonite clays and polyamides possess higher heat deflection temperature, greater toughness, and reduced moisture permeability, making them useful in automotive timing belts. Exemplary disclosures of nanocomposites include Kawasumi et al., U.S. Pat. No. 4,810,734 (1989); Usuki et al., U.S. Pat. No. 4,889,885 (1989); Okada et al., U.S. Pat. No. 4,894,411 (1990); and Maxfield et al., U.S. Pat. No. 5,385,776 (1995).

The modified clay is derived from a naturally occurring layered clay (e.g., bentonite or hectorite) in which negatively charged layered structures or sheets are held together by sodium, potassium, magnesium or other inorganic cations sitting in anionic galleries between the sheets. There may be a further layered structure within each sheet; for example silicate clays are characterized by a center layer of aluminum and magnesium hydroxides fused between two layers of silica. The sheet-to-sheet separation (or interlayer distance) is on the order of 15 Å. A layered clay in this natural state is unsuitable for the preparation of nanocomposites because it is too hydrophilic and the layers are held together too tightly by the inorganic cations to interact with the hydrophobic polymer molecules and be dispersed thereby. To make it more polymer-compatible, a layered clay is modified by replacing the inorganic cations with organic cations, with the resulting product being referred to as a "modified layered clay" or an "organoclay." Commonly, the organic cation is a quaternary ammonium cation. The replacement increases the interlayer distance to 25 Å or more, reduces the interlayer forces, and makes the clay more hydrophobic, rendering it amenable to dispersion in a polymer.

Modified layered clays also can be used for other purposes, such as thickeners for greases and polyester laminating resins and are available from suppliers such as Rheox Inc. or Southern Clay Products.

In one method, a nanocomposite is prepared by dispersing the modified layered clay in a polymerizable liquid monomer followed by polymerization of the liquid monomer in the presence of the modified layered clay. Polymerization is effected by UV light, acid, base, or heat, and the polymerization temperature typically is below 200° C. and is necessarily below 250° C. to avoid decomposition of the modified layered clay. A limitation of this method is that the polymer must be produced from a liquid monomer. Alternatively, a nanocomposite is prepared by melt blending a modified layered clay with a polymer. In this case, the modified layered clay needs to be stable at the melt processing temperature of the polymer. Hitherto, it has not been feasible to make a modified layered clay nanocomposite with a melt processed polymer such as a crystalline thermoplastic having high crystalline melting temperature (e.g., a fluoroplastic) or an amorphous polymer having a high glass transition temperature, because a conventional quaternary ammonium cation modified layered clay is stable only up to about 250° C.

SUMMARY OF THE INVENTION

I have discovered new nanocomposites made from polymers having elevated melt processing temperatures and a method for making them. Accordingly, this invention provides a composite comprising a melt blend of:

(a) 100 parts by weight of a melt processable polymer which is (i) a crystalline thermoplastic having a crystalline melting temperature ($T_m$) of at least about 220° C. or (ii) an amorphous polymer having a glass transition temperature ($T_g$) of at least about 220° C.; and (b) between 1 and 80 parts by weight of a modified layered clay having negatively charged layers and organophosphonium cations intercalated between the negatively charged layers, the organophosphonium cations having the structure

wherein $R_1$ is a $C_8$ to $C_{24}$ alkyl or arylalkyl group and each $R_2$, which may be the same or different, is an aryl, arylalkyl, or $C_1$ to $C_6$ alkyl group.

In another embodiment of the invention, there is provided a method of making a composite, comprising the steps of:

(a) providing 100 parts by weight of melt processable polymer which is (i) a crystalline thermoplastic having a $T_m$ of at least about 220° C. or (ii) an amorphous polymer having a $T_g$ of at least about 220° C.;

(b) providing between 1 and 80 parts by weight of a modified layered clay having negatively charged layers and organophosphonium cations intercalated between the negatively charged layers, the organophosphonium cations having the structure

wherein $R_1$ is a $C_8$ to $C_{24}$ alkyl or arylalkyl group and each $R_2$, which may be the same or different, is an aryl, arylalkyl, or $C_1$ to $C_6$ alkyl group; and (c) melt-blending together the melt processable polymer and the modified layered clay to form the composite.

Composites of this invention exhibit increased stiffness without a significant reduction in elongation at break, reduced vapor permeability, and improved heat stability without any noticeable change in the thermoplastic's crystallinity caused by the filler. In contrast, conventional fillers can cause a significant decrease in the mechanical properties of the thermoplastics (especially, in the case of fluoroplastics, in the elongation at break). The organoclays are relatively inexpensive compared to polymers having high melt processing temperatures, which are often expensive specialty materials. In the instance of certain fluoroplastics, properties such as solvent resistance and thermal stability are improved to an extent making them comparable polytetrafluoroethylene (PTFE) in those regards, while retaining their melt processability feature (unlike PTFE, which is not melt processable). Composites of this invention can be used in wire insulation, tubing, packaging, molded parts, seals, gaskets, O-rings, coatings, and other applications where the aforementioned properties are desirable.

BRIEF DESCRIPTION OF THE DRAWING(s)

DESCRIPTION OF THE PREFERRED EMBODIMENTS

The thermal stability of modified layered clays used in the prior art is a limiting factor in the preparation of nanocomposites wherein melt processing at elevated temperatures is a required step. Some polymers have melt processing temperatures at or above 250° C., but layered clays modified by the intercalation of quaternary ammonium cations are unstable above about 250° C. I have discovered that, by using organophosphonium cations as the intercalating agent, the thermal stability of the modified layered clay is increased to about 370° C., making it feasible to prepare nanocomposites with such polymers. The organophosphonium cation has the structure

$R_1$ is $C_8$ to $C_{24}$ alkyl or alkyl-aryl, preferably $C_8$ to $C_{18}$ alkyl or alkyl-aryl, and most preferably $C_{12}$ to $C_{18}$ normal alkyl. $R_2$ is aryl, arylalkyl, or $C_1$ to $C_6$ alkyl, preferably $C_1$ to $C_4$ normal alkyl, phenyl, or benzyl. The $R_2$'s can but need not be the same as each other. Examples of preferred $R_1$ groups include n-dodecyl, n-tridecyl, n-tetradecyl, n-pentadecyl, n-hexadecyl, n-heptadecyl, and n-octadecyl. Examples of preferred $C_1$ to $C_4$ alkyl $R_2$ groups include methyl, ethyl, n-propyl, and n-butyl. $R_1$ and/or $R_2$ may contain substituents such as methyl, ethyl, fluorine, and the like, which do not affect their thermal stability.

Figure 1:
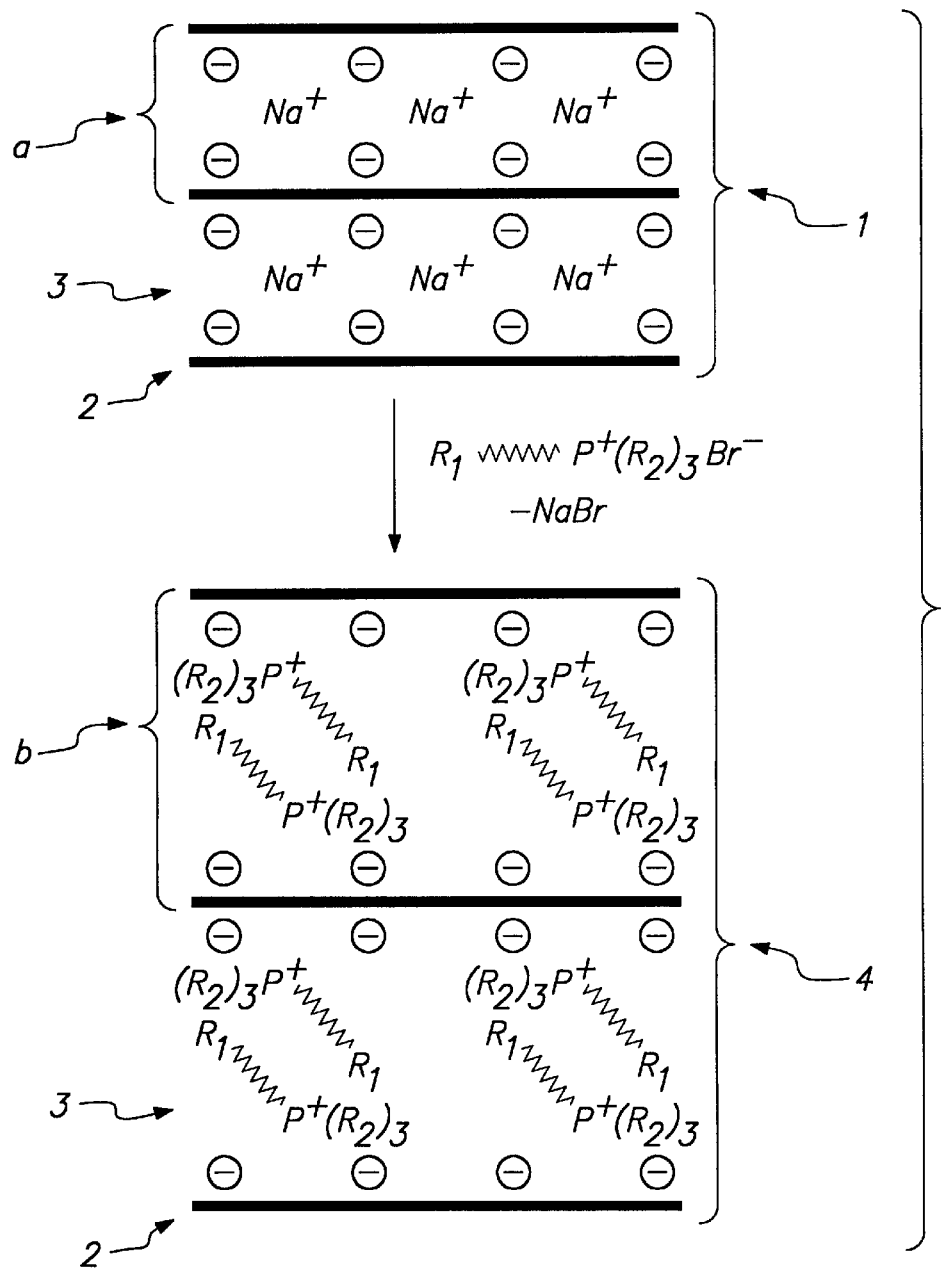
FIG. 1 depicts the synthesis of a modified layer clay for use in this invention.

The modified layered clay is synthesized from the corresponding layered clay and an organophosphonium salt (preferably as the halide, especially the chloride or bromide). The synthesis is depicted schematically in FIG. 1. Layered clay 1 has a characteristic layered structure comprising layers or sheets 2 (only one labeled for simplicity), which have negatively charged (anionic) surfaces, as indicated by the negative signs alongside. Interlayer space 3 (also referred to as a gallery) contains cations, here shown as sodium ions, although those skilled in the art will understand that other cations such as potassium or magnesium may be present, depending on the particular layered clay 2. They will also understand that FIG. 1 is schematic, and that no stoichiometry is to be implied from the relative numbers of the negative signs and sodium ions. Interlayer distance a is relatively small, on the order of 15 Å or less. Layered clay 2 is reacted with an organophosphonium salt (shown here as the bromide for illustrative purposes), resulting in the displacement of sodium cations by organophosphonium cations, to produce modified layered clay 4. Generally, substantially complete replacement of the sodium cations with organophosphonium cations is effected, and an excess of the organophosphonium salt is used to achieve this result.

It is believed that the organophosphonium salts are arranged in a head-to-tail orientation, with the tails slanted, as shown in FIG. 1, although the practice of my invention does not depend on the correctness of this belief. As a result of the intercalation of the larger organophosphonium cations between layers 2, modified layered clay has a larger interlayer distance b, on the order of 20 Å or more, depending on the size of the organic groups $R_1$ and $R_2$. Modified layered clay 4 is more amenable to delamination upon melt blending with a polymer than the precursor layered clay 2, because the former's greater hydrophobicity leads to increased wetting by the thermoplastic and because the greater interlayer distance results in a lesser interlayer bond strength.

The general procedure for preparing an organophosphonium modified layered clay is as follows: The clay is dispersed with stirring in neutral to acidic water or alcohol-water mixture at an elevated temperature (typically 80 to 90° C.). An organophosphonium salt is then added to the clay dispersion as an alcohol solution. The reaction mixture is maintained at the elevated temperature for 4 to 24 hr with continuous stirring. The modified clay is collected by filtration, dried, milled and screened to desired aggregate size.

Layered clays suitable for conversion into the corresponding modified layered clays for use in this invention are any negatively charged layered clay. By "negatively charged" I mean that the these clays have negatively charged layered surfaces. Suitable layered clays are those of the phyllosilicate type (also known as smectic clays), specific examples being montmorillonite, bentonite, kaolinite, mica, hectorite, fluorohectorite, saponite, beidelite, nontronite, stevensite, vermiculite, halloysite, volkonskoite, suconite, magadiite, kenyalite and combinations thereof.

Suitable melt processable polymers preferably have a melt processing temperature of at least about 250° C., preferably at least about 270° C. Typically, a melt processable polymer is melt processed at a temperature which is at least about 20 to 30° C. above a relevant transition temperature, which can be either a $T_m$ or a $T_g$, in order to attain complete melting (or softening) of the polymer and to lower its viscosity. Further, even if a polymer is nominally melt-processed at a temperature such as 240° C., shear heating can increase the actual localized temperature experienced by the modified layered clay to rise above 250° C. for extended periods. Thus, a melt processable polymer having a melt processing temperature of at least about 250° C. will have a $T_m$ or $T_g$ of at least about 220° C.

One class of melt processable polymers which can be used are crystalline thermoplastics having a crystalline melting temperature ($T_m$) of at least about 220° C., preferably at least about 250° C., and most preferably at least about 270° C. $T_m$ may be measured by the procedure of ASTM standard E794-85 (Reapproved 1989). For the purposes of this specification, $T_m$ is the melting peak $T_m$ as defined at page 541 of the standard. Either a differential scanning calorimeter (DSC) or a differential thermal analyzer (DTA) may be used, as permitted under the standard, the two techniques yielding similar results.

Another class of melt processable polymers which can be used are amorphous polymers having a glass transition temperature (Tg) of at least about 220° C., preferably at least about 250° C., and most preferably at least about 270° C. $T_g$ may be measured according to ASTM E 1356-91 (Reapproved 1995), again using either DSC or DTA.

Turning now to specific types of melt processable polymers which can be used, these include fluoroplastics, poly (phenylene ether ketones), aliphatic polyketones, polyesters, poly(phenylene sulfides) (PPS), poly(phenylene ether sulfones) (PES), poly(ether imides), poly(imides), polycarbonate, and the like. Fluoroplastics are preferred. The organophosphonium modified clays of this invention can also be used to make nanocomposites with polymers having lower melting temperatures, such as aliphatic polyamides (nylons), but since the conventional quaternary ammonium salts can also be used, no special advantage is obtained in such instance.

A preferred fluoroplastic is ethylene-tetrafluoroethylene copolymer, by which is meant a crystalline copolymer of ethylene, tetrafluoroethylene and optionally additional monomers. Ethylene-tetrafluoroethylene copolymer is also known as ETFE or poly(ethylene-tetrafluoroethylene), and herein the acronym ETFE may be used synonymously for convenience. The mole ratio of ethylene to tetrafluoroethylene can be about 35–60:65–40. A third monomer may be present in an amount such that the mole ratio of ethylene to tetrafluoroethylene to third monomer is about 40–60:15–50:0–35. Preferably the third monomer, if present, is so in an amount of about 5 to about 30 mole %. The third monomer may be, e.g., hexafluoropropylene; 3,3,3-trifluoropropylene-1; 2-trifluoromethyl-3,3,3-trifluoropropylene-1; or perfluoro(alkyl vinyl ether). The melting point varies depending on the mole ratio of ethylene and tetrafluoroethylene and the presence or not of a third monomer. Commercially available ETFE's have melting points between 220 and 270° C., with the grades having melting points above 250° C. being most appropriate for this invention.

ETFE for use in this invention is available from various suppliers, including from E.I. du Pont de Nemours under the tradename Tefzel (e.g., grades 280, 2181 and 2129) and from Daikin Industries under the tradename Neoflon (e.g., grades 540, 610 and 620).

Another fluoroplastic suitable for use in this invention is perfluorinated ethylenepropylene copolymer (also known as FEP), by which is meant a copolymer of tetrafluoroethylene (TFE), hexafluoropropylene (HFP), and optionally additional monomers. Preferably, FEP is predominantly random and has a relatively low HFP content, between about 1 and about 15 weight % based on the total weight of TFE and HFP. Preferably the molecular weight is between about 100,000 and about 600,000. A preferred FEP is available from E.I. du Pont de Nemours under the trade name Teflon FEP. The melting point of FEP is about 260° C.

Yet another suitable fluoroplastic is tetrafluoroethylene-perfluoro(propyl vinyl ether) copolymer (also known as PFA), by which is meant a copolymer of tetrafluoroethylene, perfluoro(propyl vinyl ether), and optionally a third monomer. The third monomer, where present, is typically present in an amount of 5 % or less by weight of the polymer and may be, for example, perfluoro(methyl vinyl ether), perfluoro(ethyl vinyl ether), perfluoro(butyl vinyl ether), or any other suitable monomer. A representative PFA has about 90 to 99 (preferably 96 to 98) weight % tetrafluoroethylene derived repeat units and about 1 to 10 (preferably 2 to 4) weight % perfluoro(propyl vinyl ether) derived repeat units. A representative crystalline melting point is about 302 to 305° C. PFA is available from E.I. du Pont de Nemours under the tradename Teflon PFA.

Suitable poly(phenylene ether ketones) are disclosed in Dahl, U.S. Pat. No. 3,953,400 (1976); Dahl et al., U.S. Pat. No. 3,956,240 (1976); Dahl, U.S. Pat. No. 4,111,908 (1978); Rose et al., U.S. Pat. No. 4,320,224 (1982); and Jansons et al., U.S. Pat. No. 4,709,007 (1987); the disclosures of which are incorporated herein by reference. Typically, they have $T_m$'s in excess of 300° C. Exemplary poly(phenylene ether ketones) comprise one or more of the following repeat units:

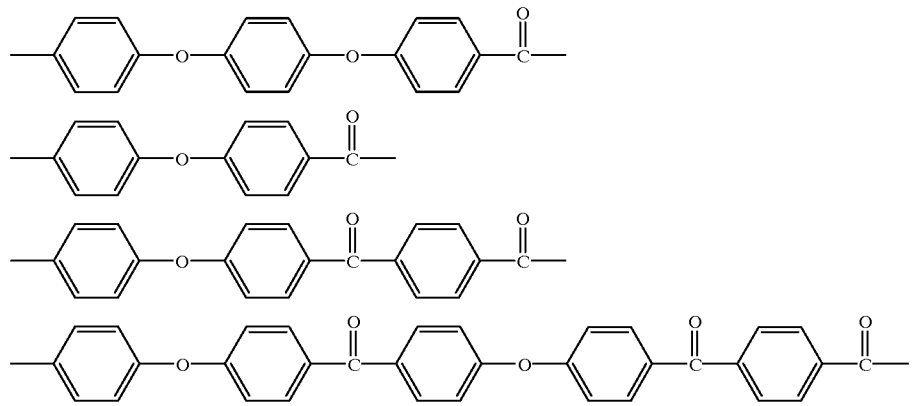

Suitable aliphatic polyketones have a repeat unit

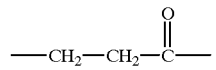

alone or in combination with a repeat unit

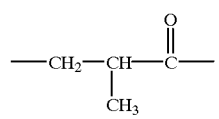

An exemplary disclosure of such aliphatic polyketones is found in Machado et al., ANTEC '95, pp. 2335–2339 (1995), the disclosure of which is incorporated herein by reference. Aliphatic polyketones are believed to be crystalline with $T_m$'s of 220° C. or above.

A suitable polyester is poly(ethylene terephthalate) (PET), having the repeat unit

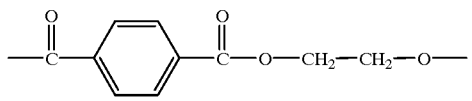

PET is available commercially from a variety of suppliers. It is believed to be crystalline, with a $T_m$ in the range of about 250 to about 265° C.

A suitable poly(phenylene sulfide) has the repeat unit

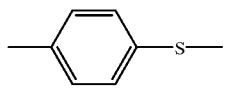

It has a $T_m$ of about 285° C. and is available under the tradename Ryton from Phillips.

Suitable poly(phenylene ether sulfones) have the repeat units such as

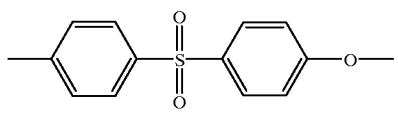

or

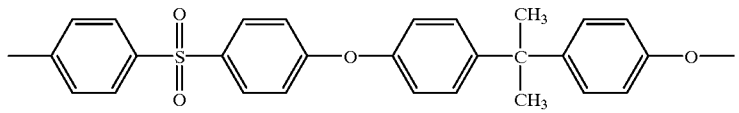

Suitable poly(ether imides) are disclosed in Wirth et al., U.S. Pat. No. 3,838,097 (1974); Heath et al., U.S. Pat. No. 3,847,867 (1974); and Williams, III et al., U.S. Pat. No. 4,107,147 (1978); the disclosures of which are incorporated herein by reference. Poly(ether imide) is available under the tradename Ultem from General Electric. A preferred poly(ether imide) has the repeat unit:

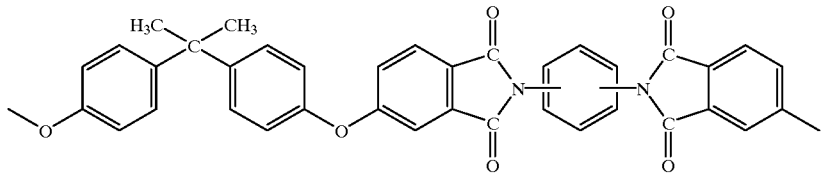

A suitable polyimide is a thermoplastic supplied under the tradename Aurum by Mitsui Toatsu Chemical, Inc. It has a $T_g$ of about 250° C. and a $T_m$ of about 388° C.

A suitable polycarbonate has the repeat unit

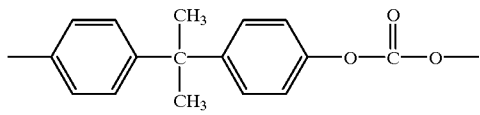

and is available from General Electric Company.

The thermoplastic and modified layered clay are used in an amount of 100 parts by weight of the thermoplastic and between 1 and 80, preferably between 10 and 80, parts by weight of the modified layer clay.

Additives conventionally used in the art can be added to the blends of this invention, including: antioxidants, UV stabilizers; flame retardants, both halogenated and unhalogenated; acid scavengers; crosslinking promoters; and pigments.

Figure 2:
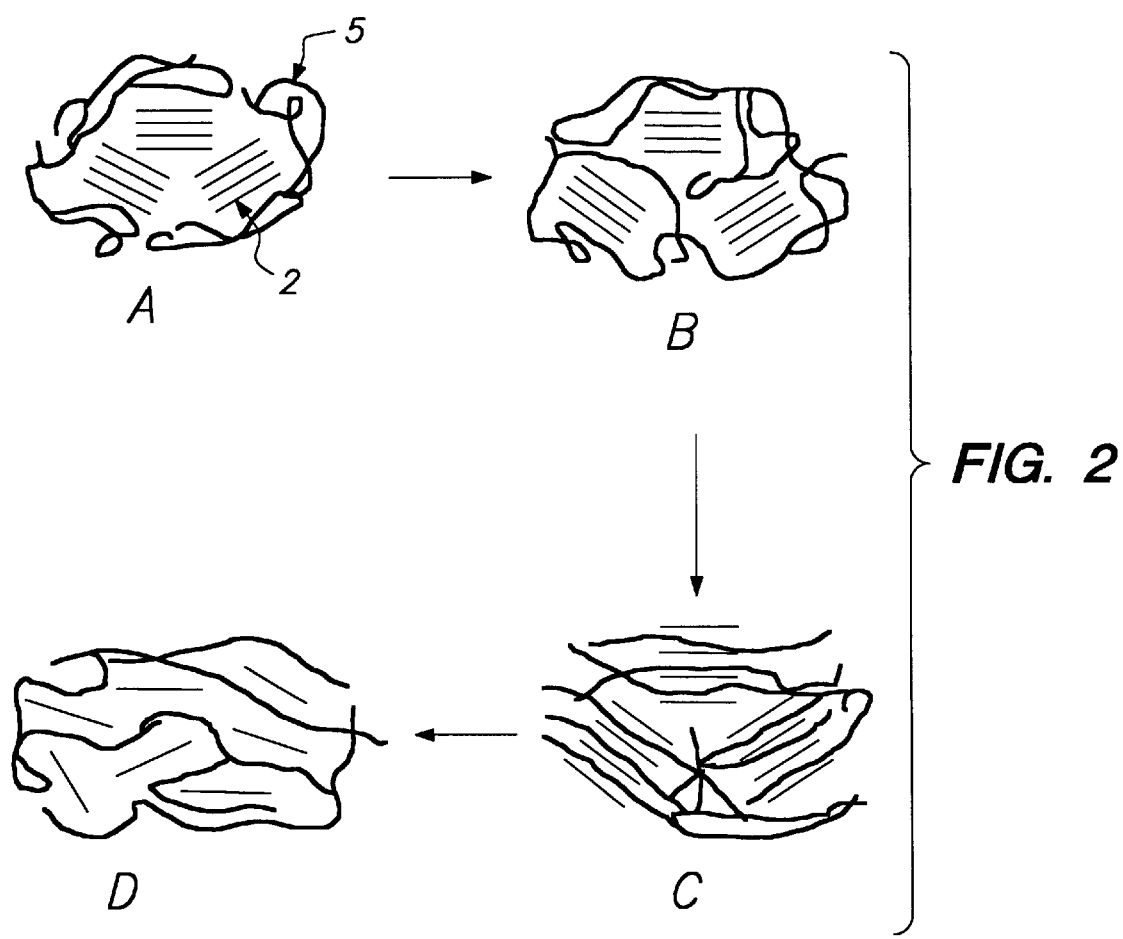
FIG. 2 depicts the interactions of molecules of the melt processable polymer and the modified layered clays upon melt blending.

FIG. 2 depicts schematically the melt blending and delamination process at the molecular level. At the start of melt blending, the interaction between fluoropolymer molecules 5 and layers 2 of the modified layered clay is shown as state A, characterized by clay aggregates distributed within the fluoropolymer melt and wetted thereby. The shear forces cause the aggregates to break apart into primary clay particles, leading to the state shown as B, in which primary clay particles are dispersed within the fluoropolymer melt. The primary clay particles are then wetted by the fluoropolymer and further shearing causes the separation of individual layers 2. Because of the organically modified nature of the interlayers, the fluoropolymer can intercalate between layers 2, shown as state C. As mixing continues, the sheets are pulled further apart and a fully delaminated nanocomposite is obtained, shown as state D. It is to be understood that in actuality, complete conversion to state D is normally not achieved, but that the blend may well contain a combination of all four states in proportions dependent on the blending conditions. An interlayer distance of at least 35 Å is indicative of the intercalation of a polymer chain between layers of clay; such separation is normally the minimum necessary for the development of useful properties. Interlayer distance may be determined by X-ray diffraction, where the 2θ (two theta) values are inversely proportional to the interlayer spacing.

The practice of my invention may be further understood by reference to the following examples, which are included by way of illustration and not of limitation.

EXAMPLE 1

This example illustrates the preparation of a modified layered clay, hexadecyltributylphosphonium hectorite ("HTPH"). Sodium hectorite (10 g) was dispersed in 50/50 v/v alcohol/water mixture (200 mL) with stirring and heating at 90° C. To this suspension was added hexadecyltributylphosphonium bromide dissolved in isopropyl alcohol (50 mL). After the completion of the addition, the entire reaction mixture was heated at 90° C. for 8 hr with stirring. The modified layered clay was collected by vacuum filtration and the filter cake was washed with water (500 mL). The clay was oven-dried at 120° C. for 24 hr. The clay powder was milled and screened through a 325 mesh (40 micron) sieve.

EXAMPLE 2

ETFE polymer (Tefzel 280, Du Pont, 34.4 g, $T_m$ 268° C. as measured by DSC) was added to a 60 cm³ Brabender mixing bowl pre-heated to 275–350° C. at a mixing speed of 10–40 rpm. After the polymer had reached flux (i.e., had completely melted), HTPH (3.8 g) was added. After completion of addition, the mixing speed was increased to 50–100 rpm and maintained there for 5–15 min. After the allotted mixing time, the mixer was halted and the compounded material was removed. Finished plaques were obtained by pressing the compounded material in a parallel plate hot press at 275–300° C., 300 to 1,000 psi for 5–15 min followed by cold pressing at 15–30° C., 300 to 1,000 psi pressure for 5–15 min. Results are provided in Table I.

TABLE I

Properties of ETFE - Modified Layered Clay Blend

| Property | Without HTPH | With HTPH |
|---|---|---|
| Young's Modulus (kpsi) | 71 ± 1 | 128 ± 3 |
| Elongation at Break (%) | 486 ± 4 | 250 ± 40 |
| Ultimate Tensile Strength (psi) | 7,800 ± 600 | 3,800 ± 900 |

EXAMPLE 3

Generally following the procedure of Example 2, a nanocomposite was made from hexadecyltributylphosphonium hectorite and Teflon FEP 100 from du Pont. Results are provided in Table II.

TABLE II

Properties of FEP - Modified Layered Clay Blend

| Property | Without HTPH | With HTPH |
|---|---|---|
| Young's Modulus (kpsi) | 52 ± 8 | 70 ± 2 |
| Elongation at Break (%) | 440 ± 40 | 400 ± 20 |
| Ultimate Tensile Strength (psi) | 4,200 ± 400 | 3,400 ± 100 |

EXAMPLE 4

Generally following the procedure of Example 2, a nanocomposite was made from hexadecyltributylphosphonium hectorite and Teflon PFA 340 from du Pont, except that a temperature of 325–350° C. was used for the Brabender mixing and hot pressing. Results are provided in Table III.

TABLE III

Properties of PFA - Modified Layered Clay Blend

| Property | Without HTPH | With HTPH |
|---|---|---|
| Young's Modulus (kpsi) | 62 ± 5 | 87 ± 2 |
| Elongation at Break (%) | 400 ± 40 | 300 ± 27 |
| Ultimate Tensile Strength (psi) | 4,050 ± 350 | 2,800 ± 150 |

EXAMPLE 5

Generally following the procedure of Example 2, nanocomposites were made from hexadecyltributylphosphonium hectorite and Ultem poly(etherimide) from General Electric. Two loading levels of HTPH were used, 2 and 5 wt %. Results are provided in Table IV.

TABLE IV

Properties of Poly(Etherimide) - Modified Layered Clay Blend

| Property | Without HTPH | With HTPH (2 wt %) | With HTPH (5 wt %) |
|---|---|---|---|
| Young's Modulus (kpsi) | 300 ± 30 | 315 ± 15 | 360 ± 10 |
| Elongation at Break (%) | 20 ± 5 | 8 ± 1 | 5 ± 2 |
| Ultimate Tensile Strength (psi) | 13,500 ± 650 | 16,000 ± 600 | 14,000 ± 500 |

EXAMPLE 6

Generally following the procedure of Example 2, nanocomposites were made from hexadecyltributylphosphonium hectorite and PEEK poly(phenylene ether ketone) from ICI. Two loading levels of HTPH were used, 2 and 5 wt. %. Results are provided in Table V.

TABLE V

Properties of Poly(Phenylene Ether Ketone) - Modified Layered Clay Blend

| Property | Without HTPH | With HTPH (2 wt %) | With HTPH (5 wt %) |
|---|---|---|---|
| Young's Modulus (kpsi) | 320 ± 20 | 370 ± 20 | 390 ± 20 |
| Elongation at Break (%) | 17 ± 1 | 7 ± 2 | 8 ± 2 |
| Ultimate Tensile Strength (psi) | 12,600 ± 100 | 13,700 ± 200 | 14,000 ± 100 |

It can be seen from the data provided in the tables that the blends exhibit a significant increase in stiffness (as measured by Young's modulus) while retaining an useful amount of elongation.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been described in terms of certain preferred embodiments, the invention is not limited to the preferred embodiments described. Rather, the scope of the invention is defined by the appended claims.

What is claimed is:

1. A method of making a composite, comprising the steps of:
   (a) providing 100 parts by weight of melt processable polymer which is a fluoroplastic selected from the group consisting of ethylene-tetrafluoroethylene copolymer, perfluorinated ethylene-propylene copolymer, and tetrafluoroethylene-perfluoro(propyl vinyl ether) copolymer;

(b) providing between 1 and 80 parts by weight of a modified layered clay, the modified layered clay being a layered clay having negatively charged layers and modified so as to have organophosphonium cations intercalated between the negatively charged layers, the organophosphonium cations having the structure $$R_1P^+(R_2)_3$$

wherein $R_1$ is a $C_8$ to $C_{24}$ alkyl or arylalkyl group and each $R_2$, which may be the same or different, is an aryl, arylalkyl, or a $C_1$ to $C_6$ alkyl group; and (c) melt-blending together the melt processable polymer and the modified layered clay to form the composite.

2. A method according to claim 1, wherein $R_1$ is $C_{12}$ to $C_{18}$ normal alkyl and $R_2$ is $C_1$ to $C_4$ alkyl, phenyl, or benzyl.

3. A method according to claim 1, wherein the modified layered clay is made by the reaction of an organophosphonium salt with a layered clay selected from the group consisting of montmorillonite, bentonite, kaolinite, mica, hectorite, fluorohectorite, saponite, beidelite, nontronite, stevensite, vermiculite, halloysite, volkonskoite, suconite, magadiite, kenyalite and combinations thereof.

4. A method according to claim 1, wherein the modified layered clay is present in an amount between 10 and 80 parts by weight.

5. A method according to claim 1, wherein the composite made has an interlayer distance between the negatively charged layers of the modified layered clay of at least 35 Å.

* * * * *